MARTIN R. SANDERS.

Improvement in Bee Hives.

No. 120,899.

Patented Nov. 14, 1871.

Witnesses
John E. Scanlan
James Null

Inventor
Martin R. Sanders

AM. PHOTO-LITHOGRAPHIC CO. N.Y. (OSBORNES PROCESS.)

UNITED STATES PATENT OFFICE.

MARTIN R. SANDERS, OF CAMBRIA TOWNSHIP, PENNSYLVANIA.

IMPROVEMENT IN BEE-HIVES.

Specification forming part of Letters Patent No. 120,899, dated November 14, 1871.

*To all whom it may concern:*

Be it known that I, MARTIN R. SANDERS, of Cambria Township, in the county of Cambria and State of Pennsylvania, have invented a new and Improved Movable-Comb Bee-Hive; and I do hereby declare that the following is a full and exact description thereof, reference being had to the accompanying drawing and to the letters of reference marked thereon.

My invention consists in the arrangement of devices for suspending the comb-frames and retaining them in place, as hereinafter described.

Figure 1:
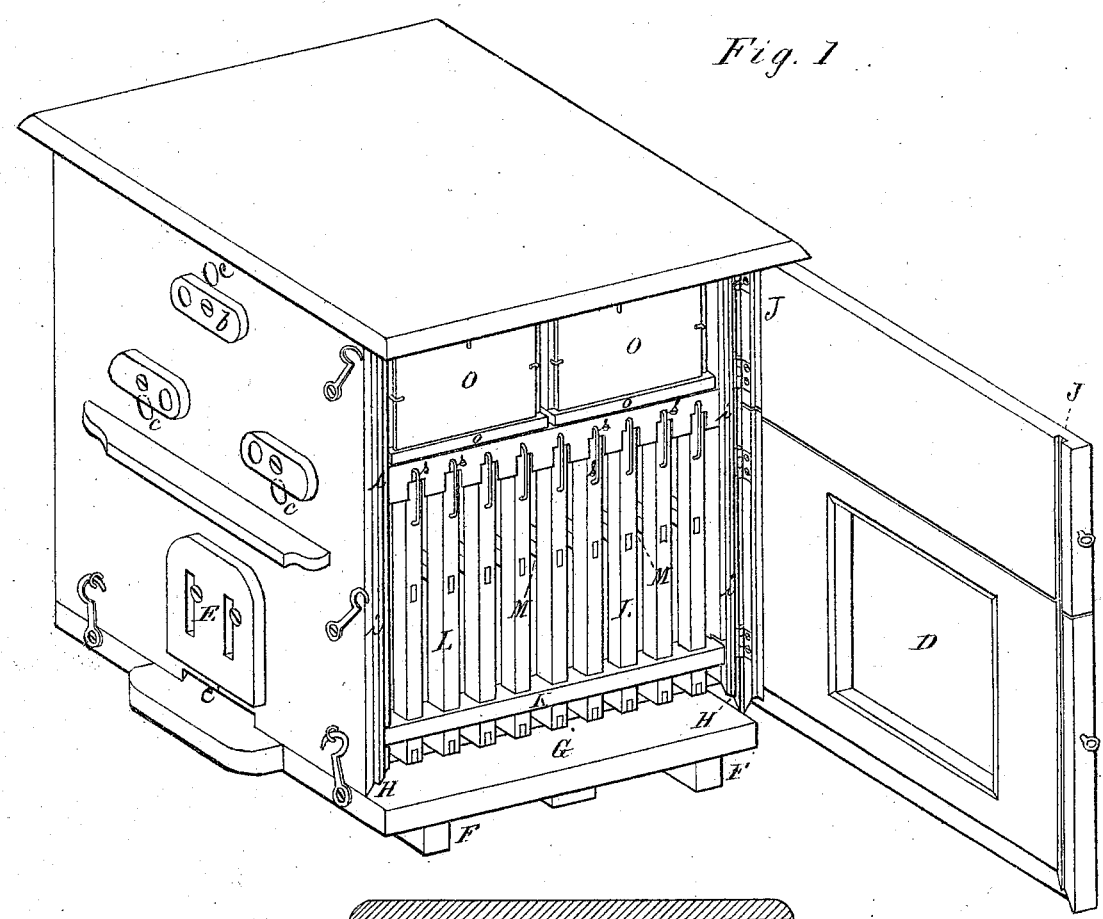
Figure 2:
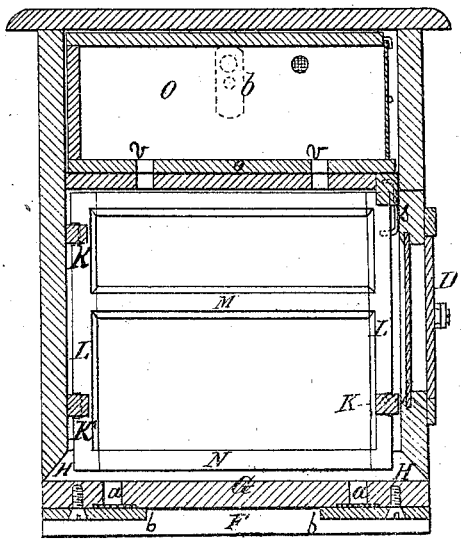

In the drawing, Figure 1 represents my improved hive in perspective, the door being open to show the interior arrangement; and Fig. 2, a transverse vertical section of the same.

The hive is of rectangular form and provided with a hinged bottom, G, having supports or feet F and a side door, with a removable glass panel, D, to permit easy and safe inspection of the operations of the bees at all times. Ventilating-apertures $a\ a$ and $c\ c$ are formed in the bottom G and side of the hive, respectively, and closed by pivoted buttons $b\ b$, which are imperforate at one end and provided with wire-gauze in the perforation of the other. The gauze affords ventilation, while preventing entrance of vermin into the hive. The door E for closing the main bee-entrance $c'$ is attached to the side of the hive by screws working in slots, as shown, and notches are formed in the side of the slats to adapt the door to be supported on the screws. The lower edge of the hive is beveled, as seen at H, to allow the bees to work all around the edge and leave no space for worms or other vermin to find a lodgment. The door D is provided with vertical grooves J in its side edges corresponding to the beads $i\ i$ on the hive. Thus a perfectly vermin-proof joint is formed, as well as one calculated to keep out moisture, &c. The comb-frames L have a bottom bar, N, and transverse middle bar, M, to form supports for the comb, so that it will not be liable to break down when being removed or transported from place to place. They are supported at the back of the hive on fixed cleats or bars K′ K′, fitting in notches, as shown, and at the front by wire hooks $s\ s$. None of the frames can be removed until the bar K is withdrawn, the same fitting in notches in the front side of the frames, and having tenoned ends entering mortises in the sides of the hive. O $o$ O $o$ are drawers for surplus honey, arranged to slide into the upper compartments of the hive, and provided with removable glass fronts.

When it is desired to remove one of the boxes it is only necessary to open the glass front and thus allow the cold air to pass in, which has the effect of immediately driving the bees into the lower part of the hive by way of the passages $v\ v$. Similarly, by removing the panel D of the door, the bees will be forced into the boxes, and the comb-frames may be manipulated with safety.

It will be observed that the door is made in two parts—the upper to close the box and lower to close comb-frame compartment.

Having thus described my invention, what I claim as new, and desire to secure by Letters Patent, is—

The combination of the movable bar K, fixed bars or cleats K′ K′, and hooks $s\ s$ with the comb-frames L M N, as shown and described, whereby the frames are held in place, as specified.

MARTIN R. SANDERS.

Witnesses:
   JAMES NULL,
   FRANK C. PLATT. (9)